Nov. 27, 1945. I. D. McEACHERN Re. 22,697

ENSILAGE HARVESTER

Original Filed May 18, 1940 6 Sheets-Sheet 1

Irvin D. McEachern
INVENTOR.

BY J. Preston Swecker
his ATTORNEY.

Nov. 27, 1945. I. D. McEACHERN Re. 22,697

ENSILAGE HARVESTER

Original Filed May 18, 1940 6 Sheets-Sheet 2

Irvin D. McEachern
INVENTOR.

BY J. Clifton Shrecker
ATTORNEY.

Nov. 27, 1945. I. D. McEACHERN Re. 22,697

ENSILAGE HARVESTER

Original Filed May 18, 1940 6 Sheets-Sheet 3

Irvin D. McEachern
INVENTOR.

BY J. Ralston Sweeker
ATTORNEY.

Nov. 27, 1945. I. D. McEACHERN Re. 22,697
ENSILAGE HARVESTER
Original Filed May 18, 1940 6 Sheets-Sheet 4
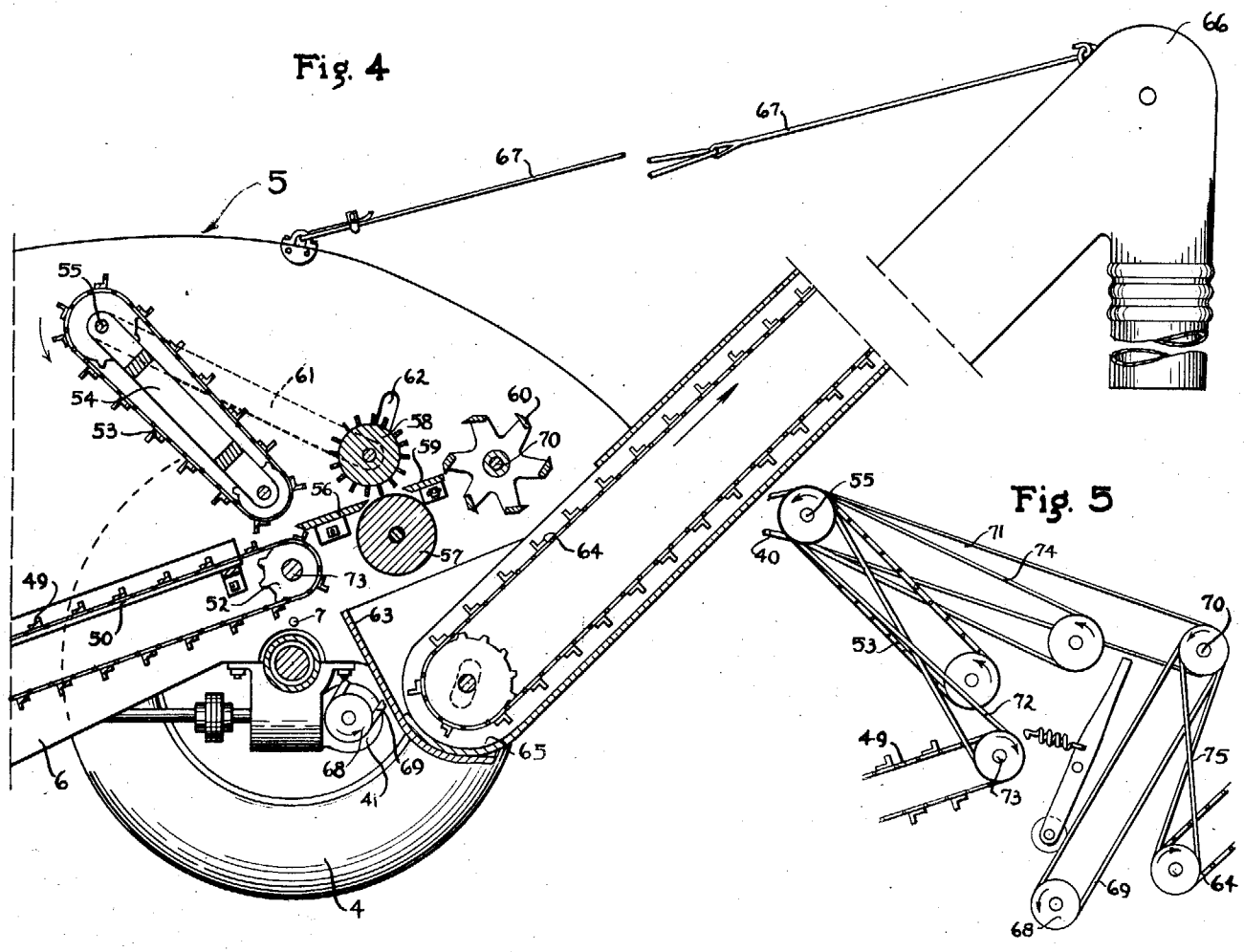
Irvin D. McEachern
INVENTOR.
BY J. Stanton Smecker
ATTORNEY.

Nov. 27, 1945. I. D. McEACHERN Re. 22,697

ENSILAGE HARVESTER

Original Filed May 18, 1940 6 Sheets-Sheet 5

Irvin D. McEachern
INVENTOR.

BY J. Ainslie Sweeten
ATTORNEY.

Nov. 27, 1945. I. D. McEACHERN Re. 22,697

ENSILAGE HARVESTER

Original Filed May 18, 1940 6 Sheets-Sheet 6

Irvin D. McEachern

INVENTOR.

BY J. Alston Smucker

ATTORNEY.

Reissued Nov. 27, 1945

Re. 22,697

UNITED STATES PATENT OFFICE 22,697

ENSILAGE HARVESTER

Irvin D. McEachern, Petersburg, Tex.

Original No. 2,348,634, dated May 9, 1944, Serial No. 336,052, May 18, 1940. Application for reissue March 17, 1945, Serial No. 583,272

11 Claims. (Cl. 56—16)

This invention relates to an improvement in ensilage harvesters of the character designed for harvesting corn or other ensilage material and chopping it into relatively short sections designed for conveyance into a silo. Harvesters of this type that have been used commercially heretofore, have been attached to a conventional farm tractor, but are not readily detachable therefrom nor pivoted for adjustment to operative and inoperative positions and have been very expensive due to their complexity of structure, both in their manufacture and in the use thereof.

The object of this invention is to improve the construction of a harvester of this type to adapt it for mounting on a tractor for transportation therewith and operation thereby, and to render it simple in construction with low cost of manufacture and efficiency in operation at low cost also, and whereby the harvester is pivotally mounted on the tractor so that it may be moved to an inoperative position for transportation.

A further object is to provide an improved tractor mounted harvester in which standing stalks are severed from a row and delivered in a prone position rearwardly to means for further operating on the stalks rearwardly of the axle.

A more specific object is to provide harvesting means on a tricycle type of tractor for severing standing stalks alongside the body of the tractor and delivering the stalks in a prone position over the rear axle of the tractor.

In carrying out these objects, I have incorporated the invention in a preferred embodiment thereof which is illustrated in the accompanying drawings in which:

Fig. 4 is a vertical sectional view through the rear portion of the harvester;

Fig. 5 is a diagrammatic view showing the driving belts for the conveyors;

The invention is shown as applied to a conventional farm tractor having the usual power plant 1 and under frame 2, the latter being supported at its opposite ends on front and rear wheels 3 and 4. The front wheels 3 are swiveled for steering, while the rear wheels 4 are mounted on the usual axles and are driven from the power plant 1 to propel the tractor.

The harvester structure in the preferred embodiment of the invention illustrated is intended for two row operation. Therefore, a harvesting unit is mounted on each side of the tractor, which operate in unison and may discharge into a common hopper at the back of the tractor as illustrated.

Figure 10:
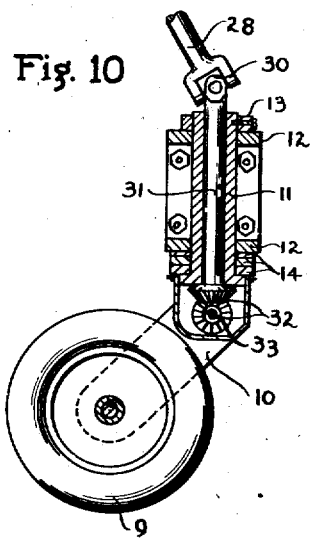
Fig. 10 is a detailed vertical sectional view of the drive wheel and its power shaft.
Figure 11:
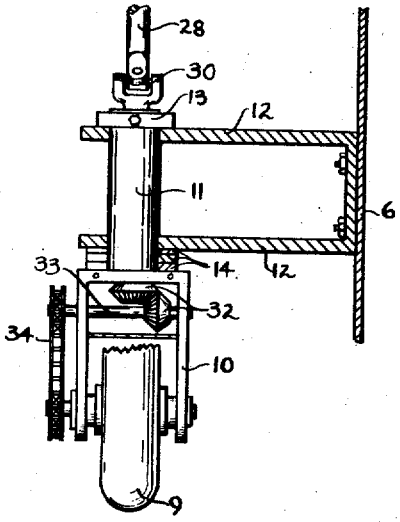
Fig. 11 is a similar view at right angles thereto partly in elevation.
Figure 12:
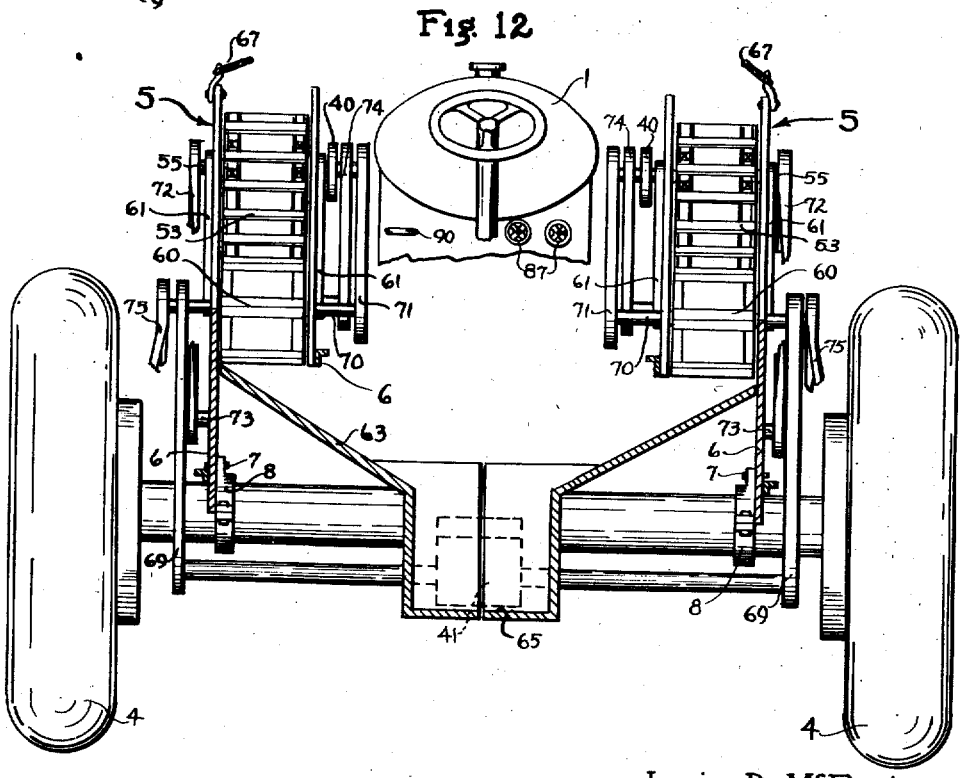
Fig. 12 is a partial rear elevation of the harvester and tractor with parts broken away and in section.

Each harvesting unit is designated generally by the numeral 5, having a frame structure 6. This frame structure 6 is pivotally connected at 7 (Fig. 4) to the rear portion of the tractor, as by clamps 8 surrounding the rear axle housing thereof, as shown in Fig. 12. The front end portion of the frame structure 6 is supported normally on a caster wheel 9 mounted in a yoke 10, as shown in Figs. 10 and 11, which yoke has a spindle 11 journaled in a bracket 12 secured to and extending laterally from a side of the frame structure 6. A collar 13 is secured to the upper end of the spindle 11. A plurality of shims 14 are interposed between the yoke 10 and the bracket 12 which shims may be removed therefrom and replaced between the collar 13 and the tractor 12, if desired, in order to adjust the height of the wheel 9, relative to the harvester frame structure, so as to raise or lower the front end portion of the harvester to cut the grain at the desired height.

Each harvester unit is provided with a throat 15 in the front end portion thereof to receive the grain as the harvester is moved along the row. In the outer side of the throat 15 is mounted an endless chain 16 extending upwardly at an angle from the front tip of the harvester, being guided on a track 17, and around sprocket wheels 18 and 19, the latter being mounted on a drive shaft 20. A second endless chain 21 extends parallel with the chain 16 and around a sprocket wheel 22 on the shaft 20 and a second sprocket wheel 23 mounted on the frame structure 6. The endless chains 16 and 21 are provided with fingers 24 thereon in position to engage the grain as the machine moves forward relative thereto and to direct it backward in the throat 15 toward the cutting mechanism hereinafter described.

The shaft 20 is driven by a sprocket chain 25 passing over a sprocket 26 on said shaft and over a sprocket 27 on a countershaft 28. The countershaft 28 is mounted in a step bearing 29 at one end thereof, while its opposite end is connected by a universal joint 30 with a drive shaft 31 journaled in the spindle 11, as shown in Figs. 10 and 11. The lower end of the drive shaft 31 is geared at 32 with a shaft 33 which is connected by a drive chain 34 with the axle of the wheel 9, whereby rotation of the wheel in contact with the ground during the forward motion of the machine will transmit movement through the chain 34, shaft 33, gear 32, drive shaft 31, universal joint 30, counter-shaft 28, and sprocket chain 25 to rotate the shaft 20. This shaft in turn operates the sprocket chains 16 and 21, as described.

Figure 2:
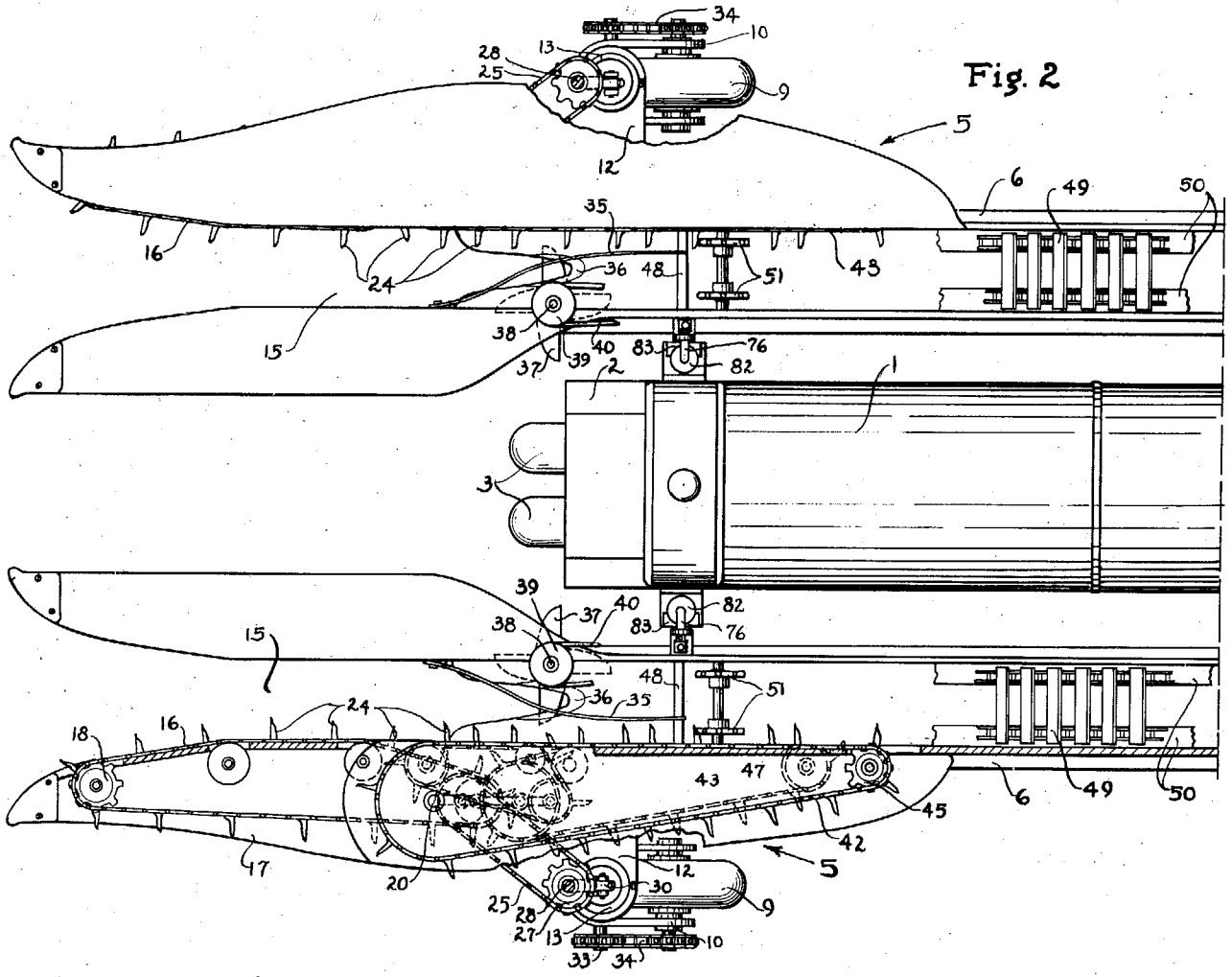
Fig. 2 is a top plan view thereof, also with parts broken away.

During the backward feeding movement of the grain by the sprocket chains 16 and 21, it is held in an upright position and pressed between the fingers 24 by a spring guide member 35 (Fig. 2), which holds the upper portions of the grain until severed and moved away from the cutting blades.

For cutting the grain, this form of the invention utilizes a stationary cutting blade 36 (Figs. 1, 8 and 9) which is formed in concave shape at its edge to receive the upstanding stalks, which blade 36 is fixed upon the lower portion of the frame 6. Operatively mounted beneath the blade 36 is a rotary cutter or sickle 37 having a plurality of cutting edges coacting with the blade 36 to provide a shearing cut for the stalks. The blade 36 and the blades of the rotary cutter 37 are removable for replacement and sharpening. The rotary cutter or sickle 37 is mounted on a shaft 38 extending upwardly in the harvester frame. The upper end portion of the shaft 38 carries a pulley 39 driven by a belt 40, which is in turn driven from a power take-off 41 on the differential of the tractor, as shown in Fig. 4. This operates the rotary cutter or sickle 37 continuously, and as the tractor moves forward the stalks are fed to the cutter by the chains 16 and 21 and are severed successively adjacent the ground.

Figure 1:
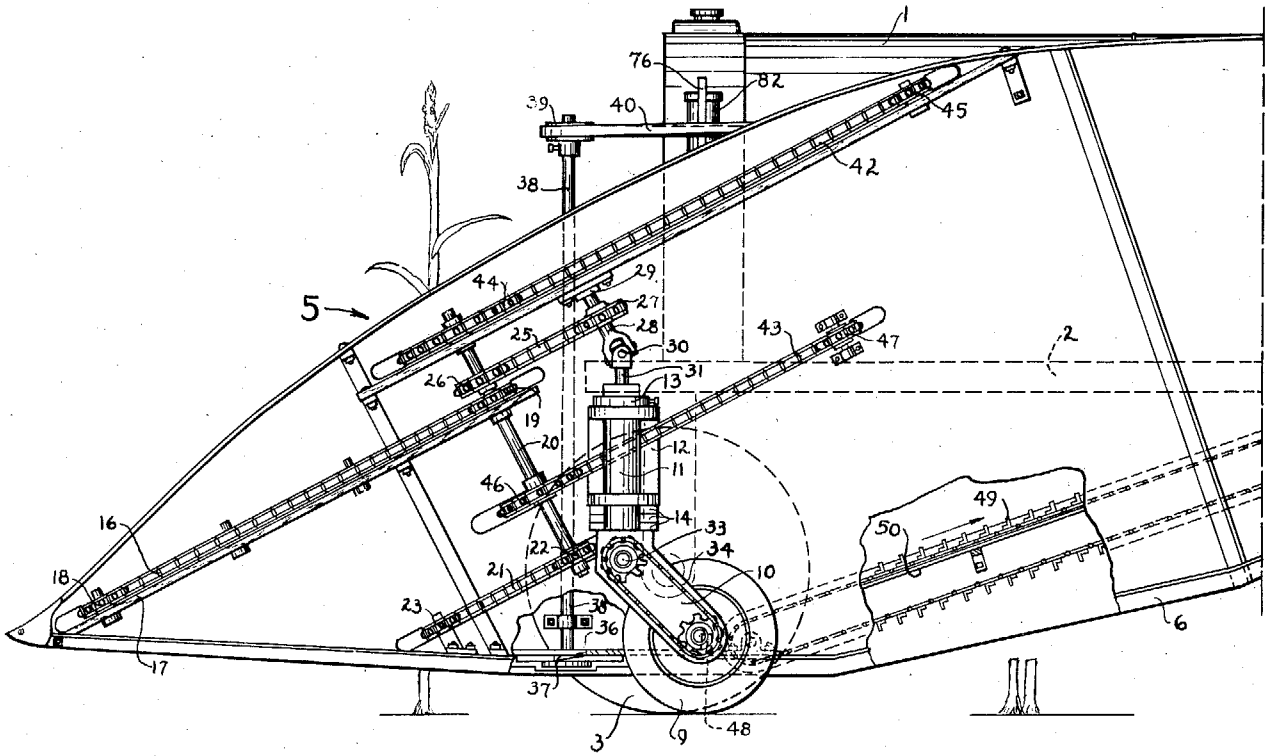
Fig. 1 is a side elevation of the invention shown applied to a tractor with parts broken away and in section.

The stalks are received from the chains 16 and 21 by conveyor chains 42 and 43 extending parallel therewith at respectively higher points on the harvester, as shown in Fig. 1. The chain 42 extends over sprockets 44 and 45 at its opposite ends, the sprocket 44 being fixed upon the shaft 20 and driven thereby. The chain 43 passes over sprockets 46 and 47, the former being mounted on the shaft 20 and driven thereby. The sprocket 46 is of smaller diameter than the sprocket 44, whereby the chain 42 has a greater linear speed than the chain 43.

Figure 8:
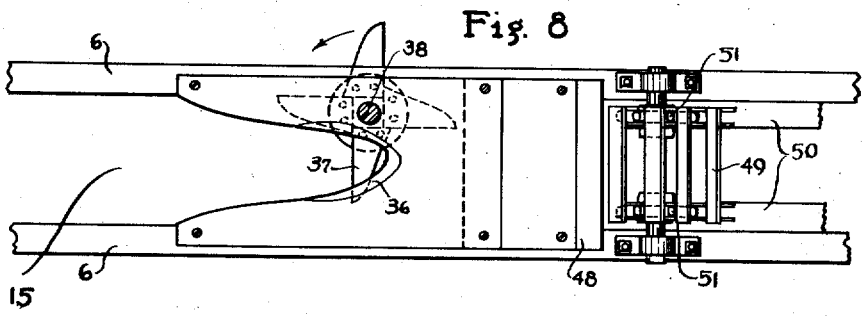
Fig. 8 is a detailed top plan view of the harvester cutting mechanism.
Figure 9:
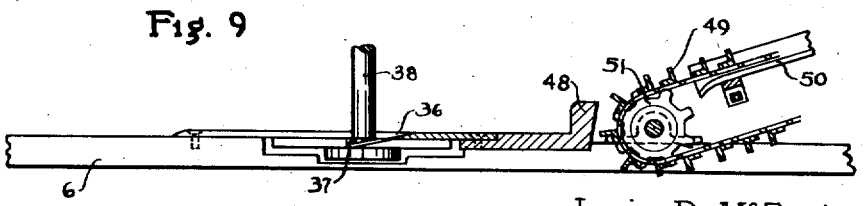
Fig. 9 is a vertical sectional view therethrough.

As the machine moves forward and the grain is gathered in by the conveyor chains 16 and 21 and severed by the cutters 36, 37, the stalks continue to move back relative to the machine until the lower ends thereof engage a stop 48 supported on the frame 6 immediately behind the stationary cutter 36, which tends to restrict backward movement of the lower end portions of the stalks, which, together with the greater linear speed of the conveyor chain 42, tends to turn the stalks down into oblique positions, where the stalks fall onto an endless flight conveyor 49 having its upper run passing over guides 50 (Figs. 1, 8 and 9). The lower end of the flight conveyor 49 is supported by sprocket wheels 51 immediately behind the stop 48 from which said conveyor extends upward to sprocket wheels 52, as shown in Fig. 4. The stalks are carried by the conveyor 49 in reclining positions flat thereon to the upper end of said flight conveyor where they pass under a feeding conveyor 53. The conveyor 53 extends about a frame 54 suspended from drive shaft 55 thereof in a normally inclined position over the flight conveyor 49 so as to compress the stalks as they reach the upper end of the flight conveyor and to direct them rearwardly therefrom to the point of cutting.

At the discharge end of the flight conveyor 49 is a platform 56 which directs the grain from said conveyor to a pair of feeding rolls 57 and 58 which direct the same over a ledger plate 59 to a rotary cutter 60 coacting therewith to chop the grain into short lengths suitable for storage in a silo. The feeding roll 58 is supported by a pair of links 61 at its opposite ends and is mounted in slots 62 in opposite sides of the harvester frame, so that it is free to move upward to accommodate for increased bulkiness in the grain fed therebeneath, and yet to compress the same and force it to the cutter 60.

Figure 3:
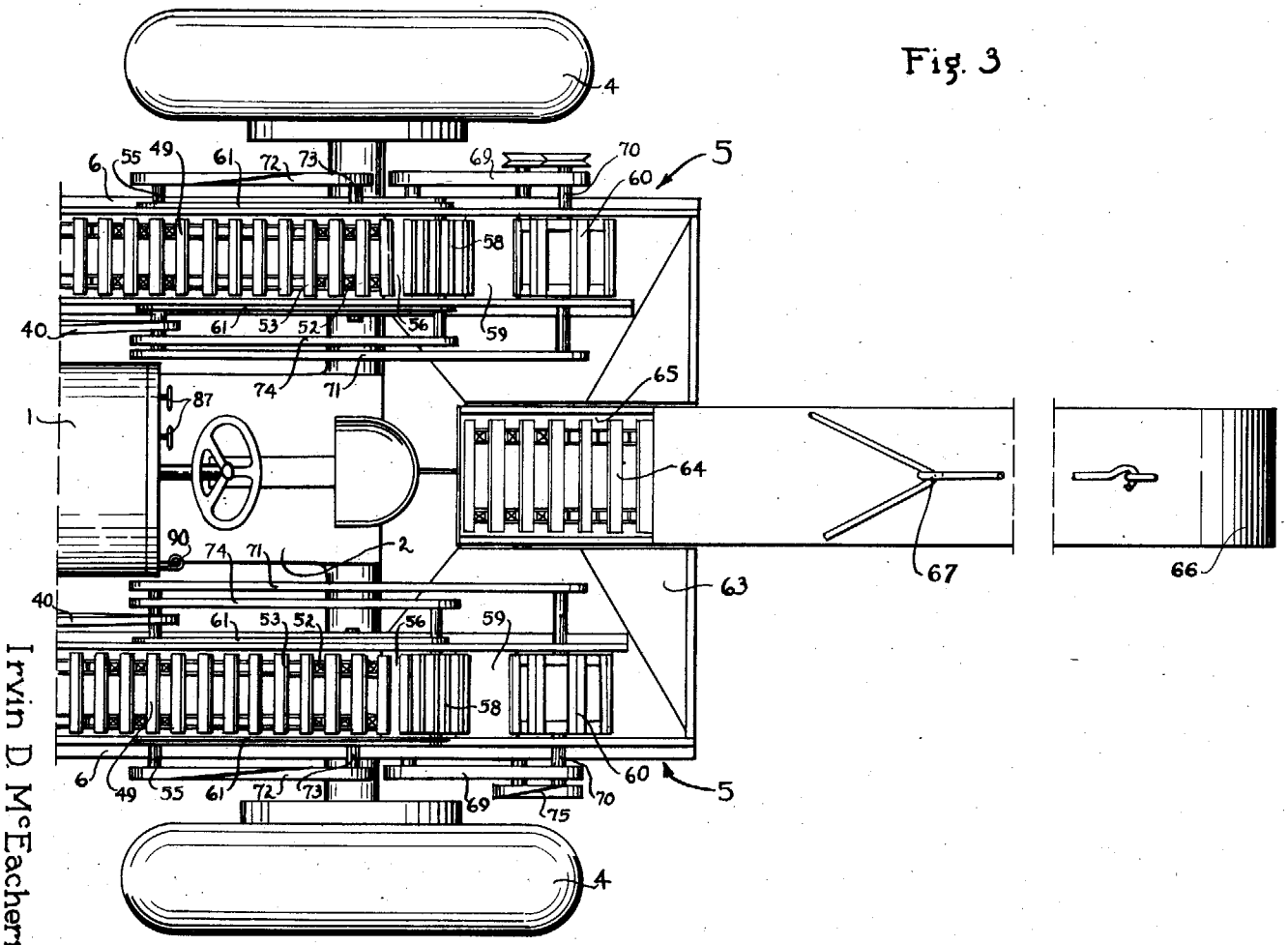
Fig. 3 is a similar view of the rear portion of the tractor and harvester.

As shown in Fig. 3, a hopper 63 is arranged beneath the rotary cutter 60 of both harvester units, and tapers toward the center of the machine to direct the chopped feed thereto. A conveyor 64 operates through a trough 65 extending upwardy from the lower portion of the hopper 63 to receive the chopped feed from the cutters 60 and to convey the same upward in the trough 65 to the upper end of a chute 66 into which it is dumped by the conveyor 64 for direction into a suitable conveyor, truck, trailer, or the like. The trough 65 is supported preferably by an adjustable cable 67 extending from the upper end thereof to a point on the harvester frame structure 6, as shown on Fig. 4.

The several conveyors just described are driven through connections, such as are shown in Fig. 5. The power take off 41 carries a pulley 68 over which passes a belt 69 to drive a shaft 70, on which shaft the cutter 60 is mounted and driven. A belt 71 connects the shaft 70 with the shaft 55 which supports and drives feed conveyor 53. A belt 72 extends from the shaft 55 to a shaft 73 supporting the sprockets 52 of the flight conveyor 49 from which the latter is driven. The shaft 55 also drives a belt 74 which is connected with and drives the feeding roll 58, and the belt 40 that leads to the pulley on the sickle shaft 38 is also driven from the shaft 55. The conveyor 64 is driven by the belt 75 from the shaft 70.

Figure 6:
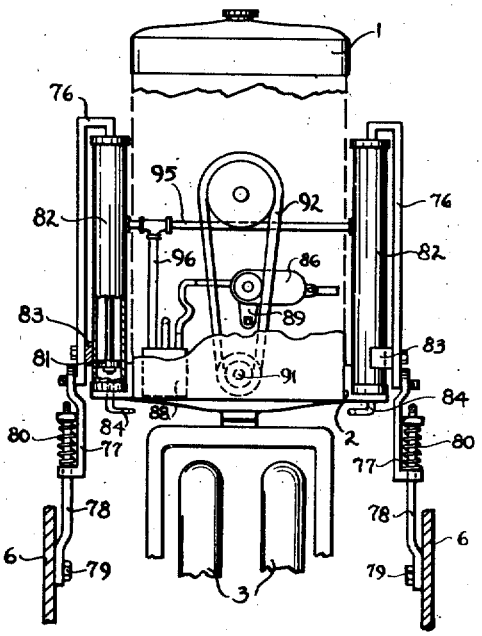
Fig. 6 is a fragmentary front elevation of the front portion of the tractor and harvester, with parts broken away and in section.

While the weight of the front end portion of each harvester unit is supported primarily on the caster wheel 9, provision is made for relieving this wheel of some of the weight as well as for raising the front end portion of the harvester to an inoperative position when desired, by a power unit connected with the front end portion of the tractor. This power unit is shown primarily in Figs. 6 and 7 of the drawings.

The front end portion of each harvester frame structure 6 is supported on an arm 76, the lower end of which arm is connected with a link 77 having an off-set lower end receiving a bolt 78, which bolt is secured to the frame structure 6 by a set screw 79. A spring 80 is interposed between the connected portions of the link 77 and bolt 78 to support the latter resiliently from the link and arm 76.

The arm 76 is carried at its upper end by a piston rod connected with a piston 81 operatively mounted in a cylinder 82 which together form a power device for raising and lowering the front end portion of each harvester unit as liquid fluid is forced into or discharged from the cylinder. The arms 76 are held in proper parallel relation by guides 83 attached to said arms and which embrace the outer portions of the cylinders 82.

Figure 7:
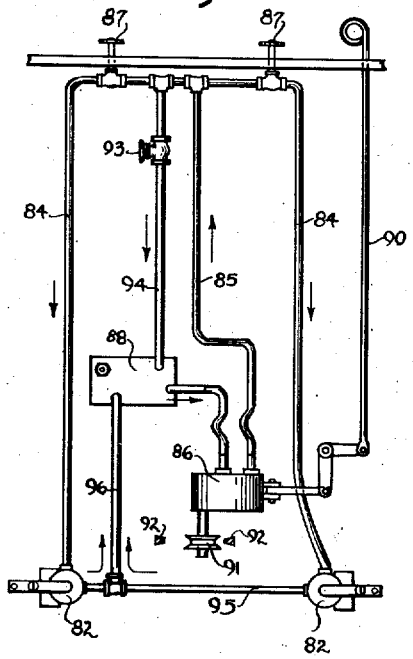
Fig. 7 is a diagrammatic view of the hydraulic lift system for the harvester.

As shown in Fig. 7, the cylinders 82 are supplied by liquid under pressure through pipes 84 joined with a supply pipe 85 connected with a pump 86. Each of the pipes 84 has a control valve 87 therein. The pump 86 supplies liquid under pressure from a reservoir 88. The pump is mounted on a swingable mounting 89 on which it is moved by lever connections 90 to swing the pump driving pulley 91 into engagement with a belt 92 which operates the fan of the engine from the drive shaft thereof.

When it is desired to move the front end portion of either or both of the harvester units either to inoperative positions or to accommodate the cutting to various heights, the valves 87 are opened after which the lever 90 is manipulated so as to swing the pulley 91 into driving engagement with the belt 92 for operating the pump 86. This will force the oil or other liquid used from the reservoir 88 through the pipes 84 and 85 into the lower ends of the respective cylinders 82, forcing the pistons 81 upward therein and raising the front end portions of the harvester units through arcs up to 45° in inoperative position. After these have been raised to the desired extent, the valves 87 are closed, the pump 86 moved back to an inoperative position, and the fluid thus pumped into the cylinders 82 will hold the front end portions in these set positions.

A combination check and manual control valve 93 is connected in a return pipe 94 to by-pass the fluid from the pump 86 back to the reservoir 88, after the closing of the valve 87.

The cylinders 82 are provided with a connected by-pass pipe 95 at the upper end portions thereof, which by-pass pipe has a connection 96 leading to the reservoir 88. Thus, when the pistons 81 move upward in the cylinders 82 beyond the points of connection of the by-pass pipe 95, the fluid is returned through said by-pass pipe to the reservoir without raising the pistons further in the cylinders to avoid risk to the operator if he should fail to close the valves 87 at the proper time. Thus upward movement of the pistons will be arrested at the proper and desired positions in the cylinders at the points of connection therewith of the by-pass pipe 95. Since the pump 86 is driven directly from the engine belt, this raising and lowering mechanism may be operated without starting the entire harvesting mechanism.

It will be evident that either or both of the harvester units may be used at one time as desired, it being necessary merely to disconnect the drive of the parts of one harvester unit at the power take-off 41 while retaining the drive for the other and allow it to be used.

The operation of the harvester will be apparent from the foregoing description. As it is moved forward, the stalks of grain are gathered in by the gathering chains 16 and 21 which move them back relative to the harvester and substantially at the same speed that the machine moves forward until the lower ends of the stalks are severed at the desired height above the ground by the rotary sickle 37 operating in conjunction with the stationary blade 36.

The sickle 37 is operated at high speed to facilitate severing of the stalks without appreciable vibration. Thereafter the stalks are directed back into reclining positions on flight conveyor 49, which directs them upward, tops first, beneath the feeding conveyor 53, and between feeding rolls 57 and 58 to rotary cutter 60 which chops the grain into relatively small pieces. The chopped grain falls from the cutter 60 into the hopper 63 from which it is conveyed upward through the trough 65 by the conveyor 64 to the point of discharge at the upper end of the chute 66.

I claim:

1. A harvester comprising a frame structure, means carried by the frame structure for severing stalks from the field, endless conveying means on the frame structure for moving the stalks relatively lengthwise of the frame structure, a drive shaft for said conveying means, a ground engaging wheel, a bracket connected with the frame structure, a yoke connected with the wheel and having a spindle journaled in the bracket, a shaft telescoped with the spindle and having geared connection with the wheel for operation thereby, and a jack shaft connected with the last-mentioned shaft and having geared connection with the drive shaft for operating the same from the wheel.

2. In a harvester, the combination of an elongated frame structure, means on said frame structure forming a throat extending lengthwise of the frame structure to receive therein upstanding stalks in the field at the forward end thereof, an endless conveyor mounted on the frame structure and extending lengthwise of the throat, said conveyor having upper and lower runs within the throat, said upper run forming a supporting surface to receive thereon the harvested stalks and to convey the same lengthwise of the throat, a primary cutter mounted on the frame structure at the forward end of the endless conveyor to sever the stalks in the field, vertically spaced gathering chains in a side of said throat for supporting the stalks and moving said stalks onto the upper run of the conveyor after severing thereof by the cutter, said upper and lower gathering chains extending from a point in front of the cutter to a point spaced rearwardly of the forward end of the conveyor, and means for operating said chains at different speeds for causing the stalks to fall to prone positions on the upper run of the conveyor.

3. In a harvester, the combination of an elongated frame structure, means on said frame structure forming a throat extending lengthwise of the frame structure to receive therein upstanding stalks in the field at the forward end thereof, an endless conveyor mounted on the frame structure and extending lengthwise of the throat, said conveyor having upper and lower runs extending substantially from side to side of the throat with said upper run arranged to form a transverse supporting surface within the throat for the harvested stalks, a primary cutter mounted on the frame structure at the forward end of the conveyor, vertically spaced gathering chains in a side of said throat for supporting the stalks and moving said stalks onto the upper run of the conveyor, said upper and lower gathering chains extending from a point in front of the cutter to a point appreciably rearward of the forward end of the conveyor, a secondary cutter at the opposite end of said endless conveyor for cutting the stalks into ensilage, and means for operating the upper gathering chain at greater speed than the lower gathering chain for causing the stalks to be moved to prone positions on the conveyor after severing thereof by the primary cutter for presentation to the secondary cutter.

4. In a harvester, the combination with a wheeled tractor, of an ensilage harvesting attachment comprising an elongated frame structure extending in side-by-side relation with the tractor, means mounting the forward and rearward end portions of the harvesting attachment on the tractor, means on said frame structure forming a throat extending lengthwise thereof to receive in the forward end thereof upstanding stalks in the field, an endless conveyor extending lengthwise of said throat and having upper and lower runs, said upper run forming a supporting surface to receive thereon the harvested stalks and to convey the same lengthwise of the throat, a primary cutter mounted on the frame structure adjacent the forward end of the conveyor to sever the stalks in the field, vertically spaced upper and lowering gathering chains in a side of said throat extending from a point appreciably forwardly of the cutter continuously to a point appreciably rearwardly of the cutter for supporting and moving the stalks onto the upper run of the conveyor after severing thereof by the cutter, and means for operating said chains at different speeds for causing the stalks to fall to prone positions on the upper run of the conveyor.

5. In a harvester, the combination with a wheeled tractor including a rear axle housing, of an ensilage harvesting attachment comprising an elongated frame structure extending in side-by-side relation with the tractor, means pivotally mounting the rearward end portion of said attachment on the rear axle housing, means mounting the front end portion of the attachment on the tractor for vertical adjustment relative thereto on said pivotal mounting, means on said frame structure forming a throat extending lengthwise thereof to receive in the forward end thereof upstanding stalks in the field, an endless conveyor extending lengthwise of said throat and having upper and lower runs, said upper run forming a supporting surface to receive thereon the harvested stalks and to convey the same lengthwise of the throat, a primary cutter mounted on the frame structure adjacent the forward end of the conveyor to sever the stalks in the field, vertically spaced upper and lower gathering chains in a side of said throat extending from a point appreciably forwardly of the cutter continuously to a point appreciably rearwardly of the cutter for supporting and moving the stalks onto the upper run of the conveyor after severing thereof by the cutter, and means for operating said chains at different speeds for causing the stalks to fall to prone positions on the upper run of the conveyor, said endless conveyor extending in an inclined direction over the rear axle housing, and a secondary cutter at the rear end of said endless conveyor for chopping said stalks into ensilage.

6. In a harvester, the combination of an elongated frame structure, means on said frame structure forming a throat extending lengthwise of the frame structure to receive therein upstanding stalks in the field at the forward end thereof, an endless conveyor mounted on the frame structure and extending lengthwise of the throat, said conveyor having upper and lower runs within the throat, said upper run forming a supporting surface to receive thereon the harvested stalks and to convey the same lengthwise of the throat, a cutter mounted on the frame structure at the forward end of the endless conveyor to sever the stalks in the field, vertically spaced gathering chains in a side of said throat for supporting the stalks and moving said stalks onto the upper run of the conveyor after severing thereof by the cutter, said upper and lower gathering chains extending from a point in front of the cutter to a point spaced rearwardly of the forward end of the conveyor, means for operating said chains at different speeds for causing the stalks to fall to prone positions on the upper run of the conveyor, and stalk receiving and feeding means located substantially in alignment with the upper run of the conveyor.

7. In a harvester, the combination of an elongated frame structure, means on said frame structure forming a throat extending lengthwise of the frame structure to receive therein upstanding stalks in the field at the forward end thereof, an endless conveyor mounted on the frame structure and extending lengthwise of the throat, said conveyor having upper and lower runs within the throat, said upper run forming a supporting surface to receive thereon the harvested stalks and to convey the same lengthwise of the throat, a cutter mounted on the frame structure at the forward end of the endless conveyor to sever the stalks in the field, vertically spaced gathering chains in a side of said throat for supporting the stalks and moving said stalks onto the upper run of the conveyor after severing thereof by the cutter, said upper and lower gathering chains extending from a point in front of the cutter to a point spaced rearwardly of the forward end of the conveyor, means for operating said chains at different speeds for causing the stalks to fall to prone positions on the upper run of the conveyor, and a stalk reducing device mounted rearwardly of the conveyor and substantially in alignment with the upper run of the conveyor.

8. In a tractor-mounted harvester, the combination with a tractor having a wide tread rear-axle structure and a narrow body portion, of an elongated frame structure positioned alongside the tractor body, means on said frame structure forming a throat extending lengthwise of the frame structure to receive therein upstanding stalks in the field at the forward end thereof, an endless conveyor mounted on the frame structure and extending lengthwise of the throat, said conveyor having upper and lower runs within the throat, said upper run forming a supporting surface to receive thereon the harvested stalks and to convey the same lengthwise of the throat, a cutter mounted on the frame structure at the forward end of the endless conveyor to sever the stalks in the field, vertically spaced gathering chains in a side of said throat for supporting the stalks and moving said stalks onto the upper run of the conveyor after severing thereof by the cutter, said upper and lower gathering chains extending from a point in front of the cutter to a point spaced rearwardly of the forward end of the conveyor, means for operating said chains at different speeds for causing the stalks to fall to prone positions on the upper run of the conveyor, and crop treating means mounted at the rear of the extended axle structure, the endless conveyor extending adjacent the axle structure and being positioned to feed the stalks substantially longitudinally and horizontally rearwardly beyond the axle structure to the crop treating means.

9. In a tractor-mounted harvester, the combination with a tractor having a wide tread rear-axle structure and a narrow body portion, of an elongated frame structure positioned alongside the tractor body, means on said frame structure forming a throat extending lengthwise of the frame structure to receive therein upstanding stalks in the field at the forward end thereof, an endless conveyor mounted on the frame structure and extending lengthwise of the throat, said conveyor having upper and lower runs within the throat, said upper run forming a supporting surface to receive thereon the harvested stalks and to convey the same lengthwise of the throat, a cutter mounted on the frame structure at the forward end of the endless conveyor to sever the stalks in the field, vertically spaced gathering chains in a side of said throat for supporting the stalks and moving said stalks onto the upper run of the conveyor after severing thereof by the cutter, said upper and lower gathering chains extending from a point in front of the cutter to a point spaced rearwardly of the forward end of the conveyor, means for operating said chains at different speeds for causing the stalks to fall to prone positions on the upper run of the conveyor, and crop treating means mounted at the rear of the extended axle structure above the axle structure, the endless conveyor extending adjacent the axle structure and being positioned to feed the stalks substantially longitudinally and horizontally over the axle structure to the crop treating means.

10. In a tractor-mounted harvester, the combination with a tractor having a wide tread rear-axle structure and a narrow body portion, of an elongated frame structure positioned alongside the tractor body extending upwardly over said axle structure and pivotally secured thereto, means on said frame structure forming a throat extending lengthwise of the frame structure to receive therein upstanding stalks in the field at the forward end thereof, an endless conveyor mounted on the frame structure and extending lengthwise of the throat, said conveyor having upper and lower runs within the throat, said upper run forming a supporting surface to receive thereon the harvester stalks and to convey the same lengthwise of the throat, a cutter mounted on the frame structure at the forward end of the endless conveyor to sever the stalks in the field, vertically spaced gathering chains in a side of said throat for supporting the stalks and moving said stalks onto the upper run of the conveyor after severing thereof by the cutter, said upper and lower gathering chains extending from a point in front of the cutter to a point spaced rearwardly of the forward end of the conveyor, means for operating said chains at different speeds for causing the stalks to fall to prone positions on the upper run of the conveyor, and stalk receiving and feeding rolls substantially in alignment with the upper run of the conveyor mounted at the rear of the extended axle structure, the endless conveyor extending adjacent the axle structure and being positioned to feed the stalks substantially longitudinally and horizontally rearwardly beyond the axle structure to the feeding rolls.

11. In a tractor-mounted harvester, the combination with a tractor having a wide tread rear-axle structure and a narrow body portion, of an elongated frame structure positioned alongside the tractor body extending upwardly over said axle structure and pivotally secured thereto, means on said frame structure forming a throat extending lengthwise of the frame structure to receive therein upstanding stalks in the field at the forward end thereof, an endless conveyor mounted on the frame structure and extending lengthwise of the throat, said conveyor having upper and lower runs within the throat, said upper run forming a supporting surface to receive thereon the harvested stalks and to convey the same lengthwise of the throat, a cutter mounted on the frame structure at the forward end of the endless conveyor to sever the stalks in the field, vertically spaced gathering chains in a side of said throat for supporting the stalks and moving said stalks onto the upper run of the conveyor after severing thereof by the cutter, said upper and lower gathering chains extending from a point in front of the cutter to a point spaced rearwardly of the forward end of the conveyor, means for operating said chains at different speeds for causing the stalks to fall to prone positions on the upper run of the conveyor, stalk feeding means mounted on the upwardly extending portion of the frame structure in a position to receive said stalks, the endless conveyor extending adjacent the axle structure and being positioned to feed the stalks substantially longitudinally and horizontally rearwardly beyond and over the axle structure to the feeding means, and a stalk reducing device mounted on the tractor at the rear of the feeding means.

IRVIN D. McEACHERN.